United States Patent [19]

Haynes

[11] 4,270,519
[45] Jun. 2, 1981

[54] SOLAR HEATING SYSTEM

[76] Inventor: Charles Haynes, 765 W. Broadway, Vancouver, B.C., Canada, V5Z 1J5

[21] Appl. No.: 5,246

[22] Filed: Jan. 22, 1979

[51] Int. Cl.$^3$ .............................................. F24J 3/02
[52] U.S. Cl. ..................................... 126/430; 165/60; 261/DIG. 27; 126/428
[58] Field of Search .............. 126/428, 429, 431, 432, 126/430, 113; 237/9 B; 165/60; 261/224, DIG. 27

[56] References Cited

U.S. PATENT DOCUMENTS

| | | | |
|---|---|---|---|
| 2,123,885 | 7/1938 | Faverty | 261/DIG. 27 |
| 2,164,718 | 7/1939 | Norman | 126/113 |
| 2,559,869 | 7/1951 | Gay | 126/431 X |
| 3,962,381 | 8/1976 | Farrish et al. | 261/151 |
| 4,126,122 | 11/1978 | Bross | 126/437 |
| 4,141,498 | 2/1979 | Marschner | 126/437 X |

FOREIGN PATENT DOCUMENTS 842123  7/1960  United Kingdom .................... 261/124

*Primary Examiner*—Albert J. Makay
*Assistant Examiner*—Henry Bennett

*Attorney, Agent, or Firm*—Hughes, Barnard & Cassidy

[57] ABSTRACT

A solar heating system adapted to provide heated air and water to a building structure with simple yet efficient components. The solar heating system comprises an air heating chamber which is exposed directly or indirectly to radiant solar energy, and air heated therein is directed to a heat exchange tank. The heated air from the air heating chamber is directed through bubble producing means, the bubbles rising through water contained in the heat exchange tank. Upon escaping from the heat exchange tank, the air may be directed to any one of three locations; firstly, the air may be directed back through the bubble producing means and into the water in the heat exchange tank, secondly, it may be directed to a building structure to provide heated, humidified air, and thirdly the escaping air may be directed to ambient atmosphere. Perforated baffle members having perforations nominally smaller than the bubbles emanating from the bubble producing means are present within the heat exchange tank to cause a circuitous upward path for the bubbles, thereby increasing the heat exchange between the bubbles and the water.

3 Claims, 4 Drawing Figures

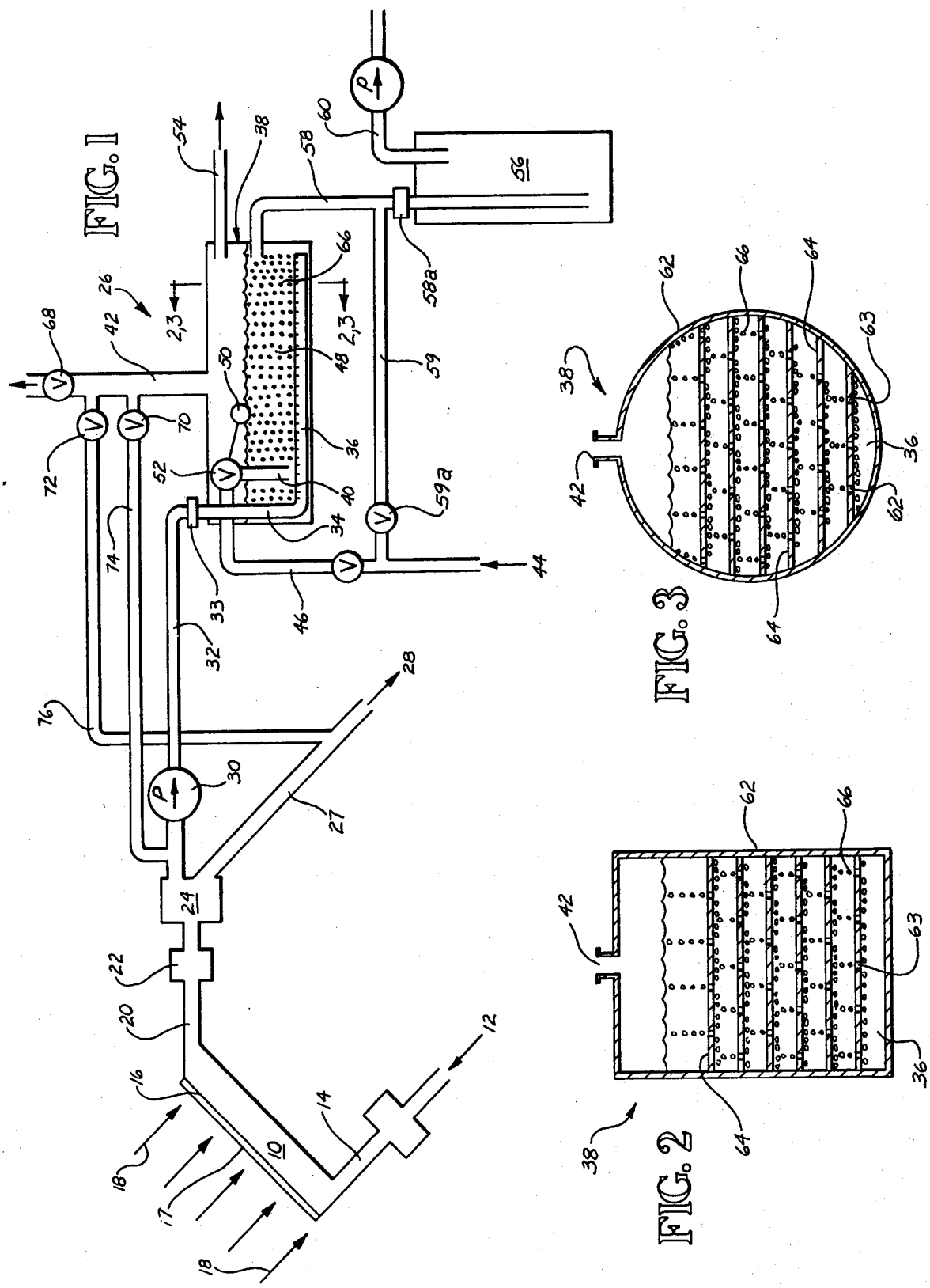

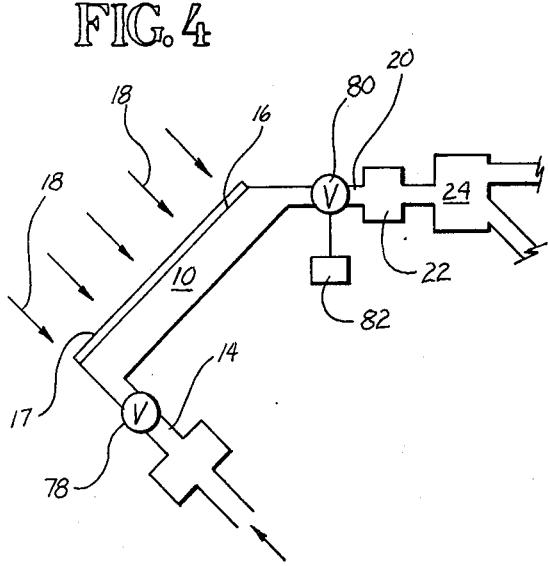

SOLAR HEATING SYSTEM

BACKGROUND OF THE INVENTION

1. Field of the Invention

The present invention relates to a solar heating system, and more particularly to a system in which air and water are heated by the absorption of radiant solar energy.

2. Brief Description of the Prior Art

Solar heating systems currently available fall typically into one of two types, the first being considerably more complex and utilizing complicated components such as solar cells and heat exchange systems. The second type of solar hearing system uses a method of exposing water to radiant solar energy, the most common having a network of copper pipes on a roof surface, the pipes typically being coated black to absorb more heat. The water is thereafter used to heat a building structure (as through radiators) or for use as hot water.

While this second system is considerably less costly and complex, there are two significant problems involved. Firstly, in temperate climates where the ambient temperature may fall below freezing for a considerable period of time, some sort of anti-freezing agent must be added to the water to prevent it from freezing within the exposed pipes. This agent typically makes the water unsuitable for personal use and may even impart undesirable odors when the water is used for space heating. A second problem associated with this type of system is water leakage from the extensive network of pipes needed to expose a significant quantity of water to radiant solar energy. Frequent repairs and damage due to water leakage make this system somewhat less than desirable.

At present, most commercially available hot water heaters utilize either an electric heating coil or natural gas flames positioned near the bottom of a hot water heating tank in order to heat the water therein. The water which is provided to the hot water tank is normally supplied from the main water source of the particular building from an outside location. Therefore, the water is typically of ambient atmospheric temperature which, in many temperate climates, may be in the range of 40° to 70° F., depending upon the season. Therefore, if water is to be heated to a temperature of 130° F. in the water heater, energy must be supplied sufficient to raise the temperature of the water 60° to 90° F.

It is known in the prior art to bubble hot gases through a body of water to raise the temperature thereof, however all such applications to date have apparently proceeded from utilizing products of combustion in order to generate the heat necessary to raise the water temperature. In U.S. Pat. No. 1,683,747, Wheeler, exhaust gases from an internal combustion engine are directed into a gas chamber, and then through a number of perforations into the body of water within the hot water tank. The gases pass upwardly in contact with the water and are thereafter discharged into the atmosphere.

U.S. Pat. No. 4,069,807, Hartig, shows a hot air heater wherein combustion products from the combustion of fuel oil or natural gas are forced through a water contacting device which cools the combustion gases and transfers heat to the water surrounding the water contacting device. The combustion gases and evaporated water are then transported through a heat exchanger where they are cooled and the evaporated water condensed and returned to the water contacting device. The combustion gases are vented to the atmosphere using a forced air system.

U.S. Pat. No. 2,536,608, Kemp, shows a liquid heater which uses products of combustion conducted through continuous or endless metal tubes as well as bubbling the combustion gases through a large volume of liquid in order to raise the temperature thereof.

U.S. Pat. No. 3,568,658, Brock, shows a burner can submerged in a water storage tank within which is combusted a mixture of gas and air. Water is admitted into the burner can from the tank and is heated therein, and then both the heated water and the combustion gases are injected back into the tank below the water level.

U.S. Pat. No. 3,371,789, Hensey, is not particularly relevant, but is cited as of interest for its aerating device.

SUMMARY OF THE INVENTION

In the present invention there is a heat absorptive surface which defines an air heating chamber therein and which is positioned at a building structure to receive radiant heat from solar energy. A heat exchange tank is also provided at the building structure and defines an enclosure therein which is adapted to contain a quantity of water to be heated therein. The heat absorptive surface and the heat exchange tank are provided at locations spaced from one another, and there are conduit means therebetween to transmit heated air from the air heating chamber to the heat exchange tank. Within the heat exchange tank there is means to discharge heated air as bubbles into the water therein. There are also pump means to force the heated air from the air heating chambers through the conduit means to the bubble producing means within the heat exchange tank.

Within the heat exchange tank there are a plurality of generally horizontally aligned perforated baffle members which interrupt the upward movement of bubbles through the water, thereby causing increased heat exchange between the bubbles and the water. The bubble producing means may be provided as either a planar plate-like member or one or more tubular members having a plurality of apertures therethrough and being operatively connected to the air heating chamber by the conduit means.

There is an air release vent at the upper portion of the heat exchange tank which removes air escaping from the water within the heat exchange tank and which may direct the air escaping therefrom to any one of three locations. The heated humidified air may be alternatively directed to a location within the building structure, it may be directed back into the heat exchange tank and through the bubble producing means, or the air escaping therefrom may be directed through the vent means into the ambient atmosphere. There are conduits with valves therein which selectively control the flow of air to the building structure, the bubble producing means, or the ambient atmosphere.

The heat absorptive surface may be positioned at a location outside of said building structure to receive solar radiant energy directly, or it may be positioned at an apex of an attic portion of the building structure in order to receive solar radiant energy indirectly.

In the method of the present invention, air and water are heated by solar energy for use in a building structure by heating air in an air heating chamber positioned at a first location in a building structure to receive radiant heat from solar energy. The hot air from the air heating chamber is directed through conduit means to a heat exchange tank, which defines an enclosure adapted to have a quantity of cool water to be heated therein. The heat exchange tank is located at a second location in the building structure spaced apart from the first location. Heated air from the air heating chamber is discharged as bubbles into the water in the heat exchange tank, thereby heating the water.

A plurality of generally horizontally aligned perforated baffle members are positioned within the heat exchange tank which direct the bubbles upwardly through the water in a circuitous path, resulting in enhanced heat exchange between the bubbles and the water due to the bubbles being retained within the water for a greater period of time.

Air escaping from the water within the heat exchange tank maybe directed back through the bubbles producing means and through the water as bubbles in order to further extract heat therefrom. The air may alternatively be directed into a building structure to provide warm humidified air therein. The escaping air may also be directed to the ambient atmosphere outside the building structure.

BRIEF DESCRIPTION OF THE DRAWINGS

FIG. 1 is a schematic view of the solar heating system of the present invention;

FIG. 2 is a cross sectional view of a first embodiment of the heat exchange tank taken along line 2—2; of FIG. 1.

FIG. 3 is a cross sectional view of a second embodiment of the heat exchange tank taken along lines 3—3; of FIG. 1;

FIG. 4 is a schematic view of a second embodiment of the solar heating system of the present invention.

DESCRIPTION OF THE PREFERRED EMBODIMENT

FIG. 1 shows a schematic diagram of a solar air and water heating system as envisioned by the present invention. There is an air heating chamber 10 (known as a solar air collector) which receives cool or return ambient air 12 by conduit means 14 to be heated therein. The surface of the air heating chamber 10, especially that surface 16 most directly in contact with solar radiation 18 is of a heat absorptive and heat retaining composition and color, such as a metallic surface coated black. Surface 17 is a transparent cover plate to reduce heat losses from the absorptive plate to the ambient air. Air within air heating chamber 10 which is heated by solar radiation 18 exits through conduit 20 and header duct 22. Air control unit 24, having a valve therein, may be utilized to direct heated air to a water heating system generally designated 26, or to a hot air system 28 for use in heating the interior of a building structure.

In the preferred embodiment, pump means 30 must be utilized to move the air from the air control unit and through the water heating system 26. The size of the air pump utilized may vary depending upon the size of the water heating system in use, as well as the energy usage of the pump means 30 relative to the energy saving realized by the solar heating system overall. It has been found that an air pump with a minimum pressure of three pounds per square inch, drawing approximately one-half amp, is sufficient to provide adequate air movement between the air heating chamber 10 and the water heating system 26 for a system typically used in a family residence. Of course, the energy usage of the pump means 30 must not be greater than the energy savings realized by the system as compared with locally available conventional water heating, or else the cost effectiveness per region will diminish or disappear.

Conduit means 32 transports heated air from pump means 30 through an optional air filter 33 to the water heating system 26. The water heating system 26 may be generally described as having air inlet conduit means 34, bubble producing means 36, an insulated heat exchange tank enclosure 38, water inlet conduit means 40 and vent means 42. Ambient water 44 is supplied to the water heating system 26 through conduit 46 and valve 46a, and a relatively stable quantity of water 48 in the heat exchange tank 38 is maintained by means of a conventional float 50 and float valve 52. Overflow conduit means 54 are provided in the event that the float valve 52 malfunctions.

A conventional hot water heater and storage tank 56 is provided to receive heated water from the heat exchange tank 38 through conduit 58 and optional charcoal filter 58a or from ambient water through conduit 59 and valve 59a. The water is heated to the desired temperature (if higher than that obtained in heat exchange tank 38) in the hot water heater 56 and thereafter pumped to desired locations in the building structure through conduit 60.

As shown more particularly in FIGS. 2 and 3, the heat exchange tank 38 may be constructed in any convenient shape, such as the rectangular design of FIG. 2 or the circular tubular design of FIG. 3. The wall or walls 62 of the heat exchange tank enclosure are preferably insulated and constructed of a material designed to retain the heat therein without a great deal being lost to the surrounding atmosphere. The bubble producing means 36 has a plurality of apertures 63 there through and is provided as a planar plate like member or as one or more tubular members and is preferably positioned along the lower edge portion of the heat exchange tank 38. In the preferred embodiment, a series of perforated baffle members 64 are arranged within the heat exchange tank 38 in a generally horizontal fashion, such that they interrupt the upward movement of bubbles 66, resulting in the bubbles 66 remaining within the water 48 a greater period of time. The perforated baffles 64 may be arranged in any configuration which would result in a circuitous upward path for bubbles 66 emanating from the bubble producing means 36. The perforated baffle members 64 are vertically spaced from one another and may extend across the enclosure 38 as shown herein, or may be arranged in a "staggered" or overlapping relationship.

The bubbles 66 which leave the water surface and the heat exchange tank through the vent means 42 may be directed in any of three directions in order to (a) provide warm humidified air to the building enclosure, (b) provide additional heated air to the bubble producing means 36, or (c) the escaping air may be vented to the atmosphere. There are valve means 68 in vent means 42, which when open, allows the passage of air from heat exchange tank 38 to the atmosphere. When closed, valve means 68 will permit the passage of air from heat exchange tank 38 through either of valve means 70 or 72. Valve means 70 connects vent means 42 with conduit means 74, which is in turn operatively connected to conduit means 32. Therefore, when valve means 68 and 72 are closed, and valve means 70 is open, heated air escaping from heat exchange tank 38 will be redirected back into the bubble producing means 36 in order to further extract heat from the air. If valve means 68 and 70 are closed, and valve means 72 is opened, air escaping from heat exchange tank 38 will be redirected through conduit means 42 into conduit means 76, whereby the heated humidified air is returned to the building enclosure 28.

The placement of the air heating chamber and the heat exchange tank may in large part determine the effectiveness of the present invention. Maximum solar energy absorption by surface 16 may occur if the air heating chamber 10 is placed exteriorly of the building structure, so that sunlight impinges directly upon surface 16. However, it may be possible to obtain temperatures within air heating chamber 10 sufficient to heat air for the present system by placing the air heating chamber immediately inside the building structure, such as within the attic at or near the apex of a roof portion of a house. In this manner, there would be no need for any of the apparatus to be directly exposed to the environment and/or weather. Since a gaseous medium, such as air in this case, has a temperature drop at a much greater rate than a liquid medium, such as water, the heat exchange tank enclosure 38 should be positioned as near as possible to the air heating chamber 10 so that as little heat as possible is lost by the air conducted from the air heating chamber 10 to the heat exchange tank 38. Conduit means 27 and 76 may be connected to a conventional air heating system, within the building structure, or they may be arranged to provide air directly to the portion of the building structure to be heated.

As indicated previously, it has been found adequate to uitlize a pump means 30 which produces at least three pounds per square inch of pressure, and which draws approximately one-half amp of electricity. It is estimated that the current system may provide forty to sixty percent of the energy needed to supply hot water to a building structure. It is estimated that water heated by the present invention will reach an average yearly temperature of 90° F., which is of course largely dependent upon the temperature of the water supplied to the system and the amount and quality of solar radiant energy impinging upon surface 16. The temperature of the water 48 within heat exchange tank 38 will of course be higher if the air supplied as bubbles is hotter, a condition that would normally exist in the summer months in temperate climates or in the generally sunny desert or semi-arid portions of temperate climates.

In that portion of temperate climates that experiences a prolonged winter period, a persistent problem with homes and offices is the build-up of static electricity in household or office fixtures due to the extremely low humidity air provided by the heating system. A particular advantage of the present invention is that air escaping from the heat exchange tank 38 and directed through valve means 72 and conduit means 76 to the heating system of the building structure, or to the structure directly, is of relatively high humidity, and when supplied to the building structure, will largely solve the static electricity problem. Therefore, while the present invention is able to provide preheated water to a hot water heating system, a second desirable result is heated, humidified noncontaminated air which may be supplied to the building structure.

The efficacy of the present invention is predicated upon providing pre-heated water to the hot water tank 56 at a temperature which requires less energy input than would have been required to heat the water to the same temperature within tank 56. As envisioned, the present invention requires an energy input only in pump means 30 so that air may be moved between air heating chamber 10 and heat exchange tank 38 with enough pressure to force the air as bubbles through water 48. Therefore, the size and energy usage of pump means 30 determines whether or not the present invention will be economically feasible for any given situation. If, however, heated water could be supplied to hot water tank 56 without any non-solar energy input whatsoever into the system, any increase in water temperature would be cost efficient (disregarding the initial set-up cost).

Turning now to FIG. 4, valve means 78 and 80 are provided as inlet and outlet valves to the air heating chamber 10, respectively. It may be possible to operate the present invention without the use of a pump, and therefore without the input of any electrical energy. If valve 80 is closed and valve 78 opened, ambient air will enter air heating chamber 10 and stabilize at ambient air pressure. If valve 78 is thereafter closed, and radiant solar energy 18 impinges upon the air heating chamber 10, the air contained within the chamber will increase in temperature and pressure within the enclosure 10. After the air is heated to a sufficient temperature, with a consequent increase in pressure within the enclosure 10, valve 80 may be opened (for instance, thermostatically or by pressure sensitive apparatus indicated schematically at 82), and the heated, pressurized air will be forced through the exit conduit 20 and through conduit means 32 and 34 to the bubble producing means 36. If the pressure within the air heating chamber 10 is great enough, and if the heat exchange tank 38 is close enough to air heating chamber 10 so that a significant pressure loss does not occur within the conduit means, the heated air will exit from the bubble producing means 36 in the same manner as if pump means 30 were activated. This process can be repeated to permit a second charge to enter the chamber 10 through the valve 78, closing the valve 78, and then later discharging the heated air through the valve 80.

What is claimed is:

1. A solar energy heating system adapted to provide preheated water and/or air to a building structure, comprising:
   a. a heat absorptive surface defining an air heating chamber having a cool air inlet and a hot air outlet end, positioned at a first location at said building structure to receive radiant heat from solar energy,
   b. a heat exchange tank at a second location at said building structure removed from said first location, said tank defining an enclosure therein and adapted to contain a quantity of cool water to be heated therein,
   c. conduit means connecting said air heating chamber and said heat exchange tank to transmit heated air from said chamber to said tank,
   d. means to discharge heated air from said air heating chamber as bubbles into said heat exchange tank,
   e. first and second valve means positioned at said cool air inlet end and said hot air outlet end of said air heating chamber, said valve means being adapted to be opened and closed responsive to pressure changes in said air heating chamber, such that said first valve means at said cool air inlet end opens to admit ambient air and said second valve means at said hot air outlet end opens to permit outflow of heated air under pressure, whereby hot air may be pumped from said air heating chamber to said heat exchange tank by the expansion of air within said air heating chamber and subsequent release of said heated air through said second valve means.

2. A solar energy heating system adapted to provide preheated water and/or air to a building structure, comprising:
   a. a heat absorptive surface defining an air heating chamber positioned at a first location at said building structure to receive radiant heat from solar energy,
   b. a heat exchange tank at a second location at said building structure removed from said first location, said tank defining an enclosure therein and adapted to contain a quantity of cool water to be heated therein,
   c. a hot water tank to contain and heat water to be used as hot water for said building structure,
   d. air conduit means connecting said air heating chamber and said heat exchange tank to transmit heated air from said chamber to said tank,
   e. means to discharge heated air from said air heating chamber as bubbles into said heat exchange tank to heat water therein,
   f. pump means to force heated air from said air heating chamber through said air conduit means and said bubble producing means into said heat exchange tank,
   g. water conduit means to direct water from said heat exchange tank to said hot water tank,
   h. an air release vent adapted to receive air escaping from water in said heat exchange tank,
   i. first conduit means connected to said vent to permit said escaping air to exit to ambient atmosphere,
   j. second conduit means connected to said vent and to said means to discharge heated air as bubbles to permit the return of said escaping air to said means to discharge air as bubbles within said heat exchange tank,
   k. third conduit means connected to said vent to direct said escaping air to said building structure, and
   l. valve means to selectively control flow of air to said first, second and third conduits, whereby, cool air introduced into said air heating chamber is heated therein due to the absorption of solar radiant energy, with said heated air being conducted to said heat exchange tank so that heat is transferred to said water, and water from said heat exchange tank can be directed to said hot water tank to provide hot water for said building structure, and said air escaping from said heat exchange tank may be redirected through said water as bubbles to further remove heat from said air, or said air may be directed to said building structure to heat said building structure, or discharged to ambient atmosphere.

3. A solar energy heating system adapted to provide perheated water and/or air to a building structure, comprising:
   a. a heat absorptive surface defining an air heating chamber positioned at a first location at said building structure to receive radiant heat from solar energy,
   b. a heat exchange tank at a second location at said building structure removed from said first location, said tank defining an enclosure therein and adapted to contain a quantity of cool water to be heated therein,
   c. air conduit means connecting said air heating chamber and said heat exchange tank, to transmit heated air from said chamber to said tank,
   d. means to discharge heated air from said air heating chamber as bubbles into said heat exchange tank,
   e. pump means to force heated air from said air heating chamber through said conduit means and said bubble producing means into said heat exchange tank,
   f. an air release vent adapted to receive air escaping from water in said heat exchange tank,
   g. first conduit means connected to said vent to permit said escaping air to exit to ambient atmosphere,
   h. second conduit means connected to said vent and to said means to discharge heated air to permit the return of said escaping air to said means to discharge air as bubbles within said heat exchange tank,
   i. third conduit means connected to said vent to direct said escaping air to said building structure,
   j. valve means to selectively control flow of air to said first, second and third conduits,
   k. a hot water tank to store water from said heat exchange tank,
   l. water conduit means to direct water from said heat exchange tank to said hot water tank.

* * * * *